United States Patent

[11] 3,612,226

| [72] | Inventors | Maurice P. Pauwels;<br>Bert A. Gumkowski, both of South Bend, Ind. |
|---|---|---|
| [21] | Appl. No. | 864,779 |
| [22] | Filed | Oct. 8, 1969 |
| [45] | Patented | Oct. 12, 1971 |
| [73] | Assignee | The Bendix Corporation |

[54] CALIPER BRAKE HOUSING SUPPORT AND SHOE ANTIRATTLE SPRING
2 Claims, 4 Drawing Figs.

| [52] | U.S. Cl. | 188/73.3, 188/73.6, 188/205 A |
|---|---|---|
| [51] | Int. Cl. | F16d 55/224 |
| [50] | Field of Search | 188/73.3, 73.5, 205 A, 73.6 |

[56] References Cited
UNITED STATES PATENTS

| 3,368,647 | 2/1968 | Laverdant | 188/73.3 |
|---|---|---|---|
| 3,403,756 | 10/1968 | Thirion | 188/73.3 |
| 3,493,084 | 2/1970 | Maurice | 188/205 A |

*Primary Examiner*—George E. A. Halvosa
*Attorney*—C. F. Arens and Plante, Arens, Hartz, Hix and Smith

ABSTRACT: A disc brake includes a caliper and a pair of friction elements slidably mounted on a U-shaped fixed support that straddles the rotor. A clip of resilient material interconnects the fixed support and the caliper for urging the caliper radially outwardly with respect to the rotor toward a pair of projections on the fixed support. The clip includes a pair of legs extending generally downwardly from the clip to engage the friction elements, thereby urging the latter toward the fixed support to prevent the shoes from rattling. The clip further includes a pair of upwardly extending arms engaging opposite ends of a removable key disposed between the caliper and one of the projections for retaining the key in the installed position.

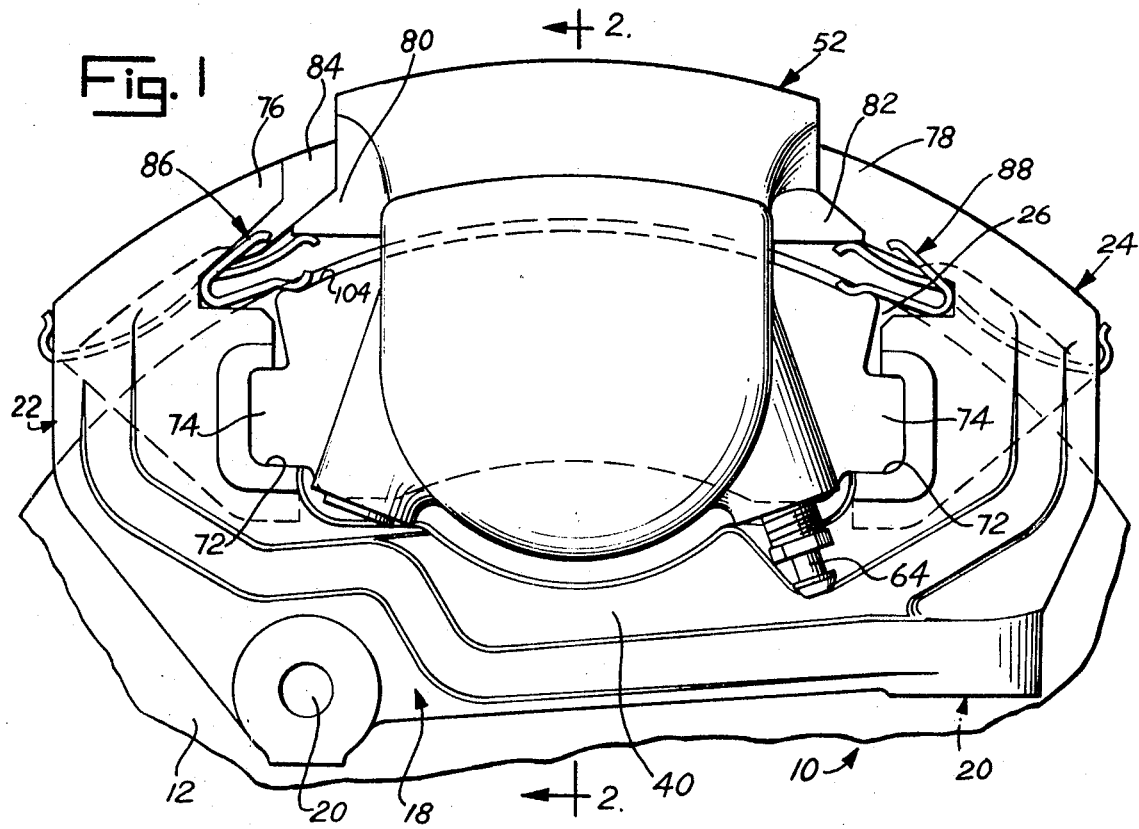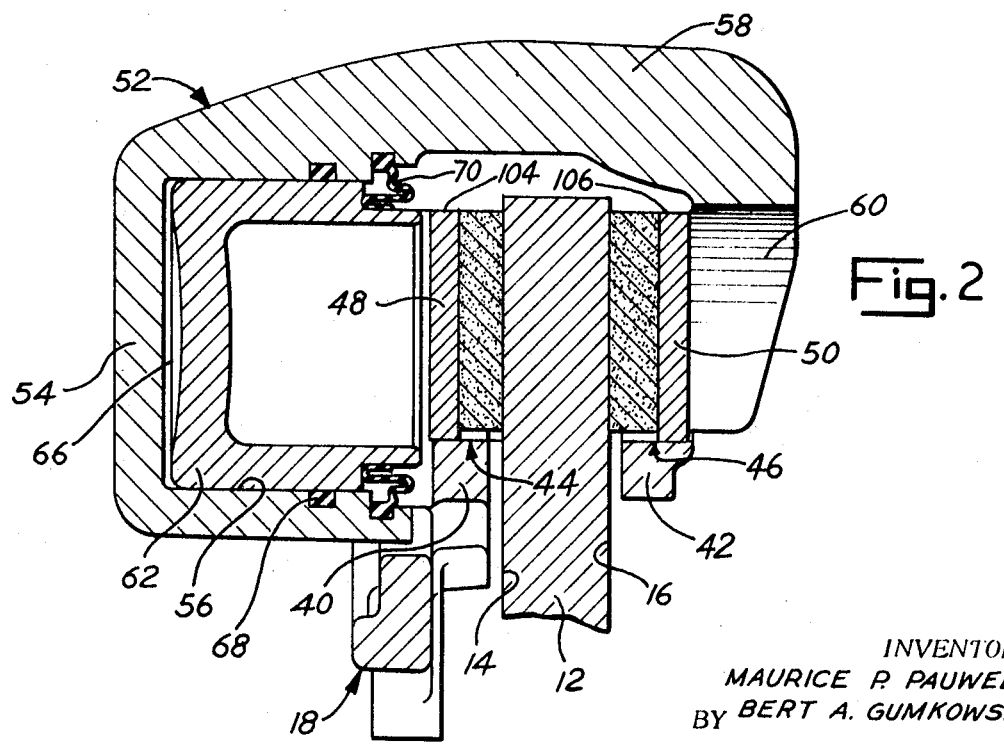

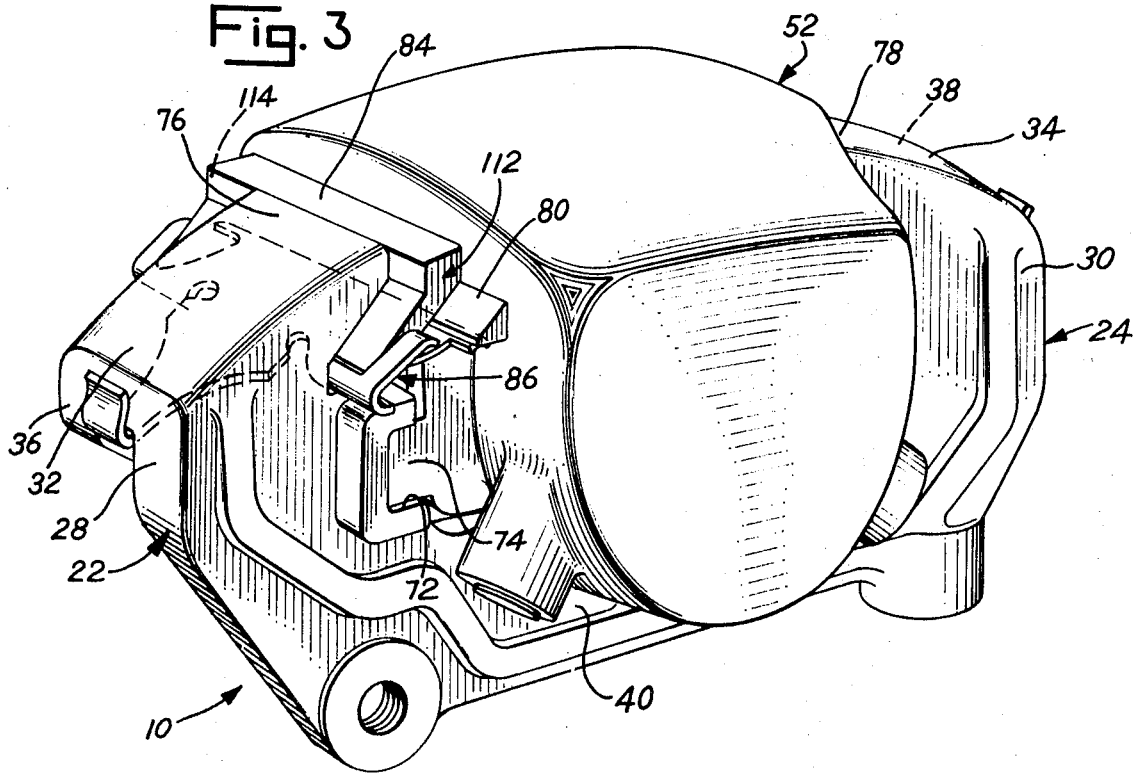
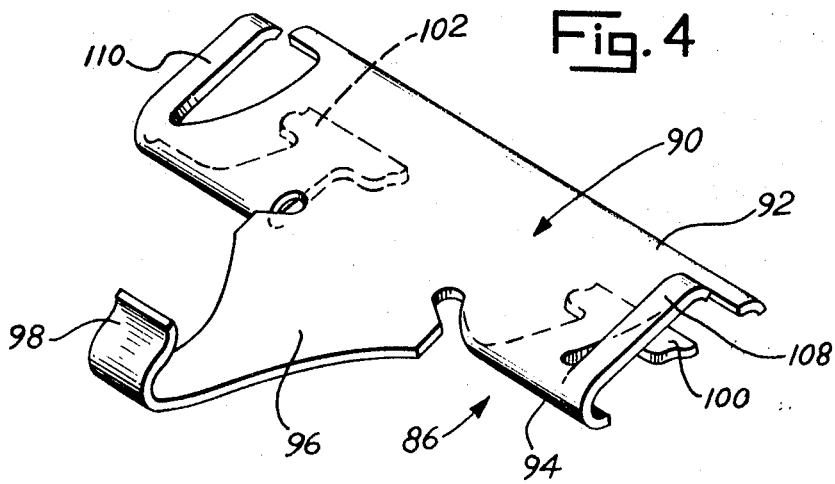

3,612,226

CALIPER BRAKE HOUSING SUPPORT AND SHOE ANTIRATTLE SPRING

BACKGROUND OF THE INVENTION

This invention relates to a disc brake.

Disc brakes of the type having a caliper slidably mounted on a U-shaped fixed support that straddles the rotor have become increasingly popular, due partly to the fact that the friction elements used in this type of brake may be removed therefrom without removing the fixed support from the vehicle, thereby facilitating brake relining. Such a brake is shown in U.S. Pat. No. 3,403,756 to Thirion, licensed to the assignee of the present invention. Briefly, the Thirion patent discloses a disc brake of the above-mentioned type in which a pair of keys are disposed between the fixed support and the caliper, which is urged toward the keys by a pair of resilient clips. Four clevis pins are provided to hold the keys in place, and at least two shoe antirattle springs must be provided. Although this design has been quite successful, the brake does require a number of parts, which of course increases its cost.

SUMMARY OF THE INVENTION

Therefore, an important object of our invention is to provide a disc brake of the aforementioned construction having substantially fewer parts than the brakes known in the prior art.

Another important object of our invention is to provide a brake of the aforementioned type in which the functions performed by the caliper retaining member, the shoe antirattle springs, and the clevis pins holding the keys in place are performed by a pair of resilient clips.

Another important object of our invention is to facilitate assembly and disassembly of the brake.

DESCRIPTION OF THE DRAWINGS

FIG. 1 is a side elevational view of a brake made pursuant to the teachings of our present invention;

FIG. 2 is a cross-sectional view taken along line 2—2 of FIG. 1;

FIG. 3 is a perspective view of the brake shown in FIGS. 1 and 2; but illustrated with the rotor thereof removed; and FIG. 4 is a perspective view of the spring clip used in the brake of our present invention to retain the caliper on the fixed support.

DETAILED DESCRIPTION

Referring now to the drawings, a disc brake 10 includes a rotor 12 having a pair of opposed friction surfaces 14 and 16 on opposite sides thereof. The rotor 12 is mounted in the usual manner for rotation with a member to be braked (not shown). A torque member 18 is secured to a nonrotative part of the vehicle, such as the axle flange, by inserting bolts through the openings 20. The torque member 18 includes a pair of circumferentially spaced arms 22, 24 defining a recess 26 therebetween exposing a portion of each of the friction faces 14, 16. Each of the arms 22, 24 includes a first section 28, 30 extending generally parallel to the friction face 14, a second section 32, 34, extending parallel to the axis of rotation of the rotor 12 and straddling the latter, and a third section 36, 38 that extends generally parallel to the other friction face 16. The arms 22, 24 are interconnected by a pair of horizontally extending portions 40, 42 of the torque member 18 which are disposed on opposite sides of the rotor 12, as best seen in FIG. 2. The upper ledges 44, 46 of the portions 40, 42 define the lowermost edge of the recess 26, and slidably support a pair of friction elements 48, 50 adjacent the friction faces 14, 16, respectively.

A caliper 52 is slidable with respect to the torque member 18 in the recess 26 and includes a housing 54 defining a bore 56 therewithin, a bridge portion 58 straddling the rotor 12, and a radially inwardly extending portion 60 which engages the friction element 50. A piston 62 is slidably disposed in the bore 56 and engages the other friction element 48. The usual inlet 64 is provided to communicate pressurized brake fluid into chamber 66 defined by the rear face of the piston 62 and the closed end of the bore 56. A seal 68 is provided between the piston 62 and the bore 56 to prevent brake fluid from escaping from the chamber 66. A flexible boot 70 is provided to exclude contaminants from the bore 56.

The inner, vertically extending edges of the arms 22, 24 respectively, are provided with notches 72 which receive lugs 74 on the friction elements 48, 50 for holding the latter in position. A pair of projections 76, 78 extend from the arms 22, 24 respectively, circumferentially toward each other along the periphery of the rotor 12, projecting into the recess 26. A pair of axially extending ledges 80, 82 are formed integrally with the bridge 58 of the caliper 52. The projection 78 is adapted to engage the ledge 82 and an adjacent portion of the caliper. A key 84 is disposed between the projection 76, the caliper 52, and the ledge 80. A pair of resilient clips 86, 88 interconnect the torque member 18 and the caliper 52 for biasing the latter radially outwardly with respect to the rotor 12 toward the projections 76, 78.

Clip 88 is identical to the clip 86, so only the latter will be described in detail. Clip 86 includes an axially extending section 90 which extends across the rotor 12 and extends generally parallel to the key 84. Section 90 has a forwardmost edge 92 adapted to engage the ledge 80 and a rearwardmost edge 94 adapted to engage the vertically extending sections 28 and 36 of the arm 22 at a point just below the projection 76. Clip 86 further includes a tapered, circumferentially extending trailing portion 96 extending from the rearwardmost edge 94 between the rotor 12 and the axially extending section 32 of the arm 22, terminating in a hook 98 adapted to engage the outermost edge of the section 32 to retain the clip 86 in position.

A pair of legs 100, 102 extend generally downwardly from the rearwardmost edge 94 underlying the axially extending section 90. The legs 100, 102 are disposed on opposite sides of the rotor 12 and are adapted to engage the upper edges 104, 106 of the friction elements 48, 50. The legs 100, 102 yieldably urge the corresponding friction elements 48, 50 downwardly into engagement with a corresponding ledge 44 or 46 on the torque member 18 to prevent the friction elements 48, 50 from rattling. A pair of arms 108, 110 extend upwardly from opposite ends of the rearward most edge 94 and engage a corresponding end 112, 114 of the key 84 to retain it in the installed position. Although the clips 86, 88 have been shown as being identical, the arms 108, 110 on the clip 88 may be omitted, since there is no key for them to retain. However, the brake may be more economically produced if the clips are identical.

MODE OF OPERATION

To apply the brakes, the vehicle operator depresses the usual pedal in the operator's compartment which develops pressure in the master cylinder connected thereto. Fluid is forced into the chamber 66 through the inlet 64, and urges the piston 62 and the friction elements 48 associated therewith toward the friction face 14 on the rotor. Those skilled in the art will recognize that since the caliper 52 is slidable with respect to the torque member 18, reaction forces acting through the caliper 52 will also urge the friction element 50 toward the face 16 of the rotor 12. Engagement of the friction elements 48, 50 with the friction faces 14, 16 retards rotation of the rotor 12, thereby stopping the vehicle. It should be noted that as the brake is applied, the ledge 80 slides between the key 84 and the outermost edge 92 of the clip 86. Similarly, the other ledge 82 slides between the projection 78 and the clip 88. The fluid force applied to the piston easily overcomes the friction forces due to the sliding engagement of the various members during the relative small axial movement of the caliper.

When it is necessary to disassemble the brake such as, for example, when wear on the friction elements necessitates their replacement, the mechanic uses an appropriate tool to deflect the arms 108, 110 away from the ends 112, 114 of the key 84. The key can then be removed from the assembly in a direction parallel to the axis of rotation of the rotor 12. The caliper 52 can then be removed by lifting it radially outwardly from the torque member 18, permitting replacement of the friction elements 48, 50. The brake may then be reassembled by replacing the caliper 52 and key 84, and then bending the arms 108, 110 back into a position engaging the ends of the key 84. Proper reassembly is assured, since the mechanic does not have to remember to replace separate antirattle springs, clevis pins, etc., the clips 86 and 88 performing the function of all of these parts required in prior art devices.

We claim:

1. In a disc brake:

a rotor having a pair of friction faces;

a fixed support having a pair of circumferentially spaced arms having a section extending generally parallel to one of said friction faces, an axially extending section straddling the periphery of said rotor, and a section extending in a radially inward direction parallel to the other of said friction faces;

a caliper slidable with respect to said fixed support straddling said rotor;

a pair of friction elements adjacent each of said faces operatively connected to said caliper;

a key disposed between one of said arms and said caliper;

resilient means operatively connecting said fixed support with said caliper for urging the latter toward said fixed support;

said resilient means including structure engaging each of said friction elements for urging the latter toward said fixed support, and abutments projecting from said resilient means for engaging said key to prevent movement of the latter in a direction substantially parallel to the axis of rotation of said rotor.

2. The invention of claim 1 wherein said resilient means includes a bent sheet metal clip having a central portion shaped generally in the form of a V section;

a lateral projection extending from the center of said V section for engagement with said fixed support;

said V section having one part thereof comprised of two legs at either end thereof which extend in a direction opposite to said lateral projection, said legs resiliently abutting said friction elements, said V section having the other part thereof comprised of a central resilient abutment member which likewise extends in a direction opposite to said lateral projection, said central resilient abutment member engaging said caliper and biasing same outwardly against said arms; and separate elevated elements at either end of the other part of said V section which engage said key and prevent movement of the latter substantially parallel to the axis of rotation of said rotor.